INVENTOR.
LEWIS G. SCHOWALTER.
BY
SETTLE, BATCHELDER & OLTMAN.
ATT'YS.

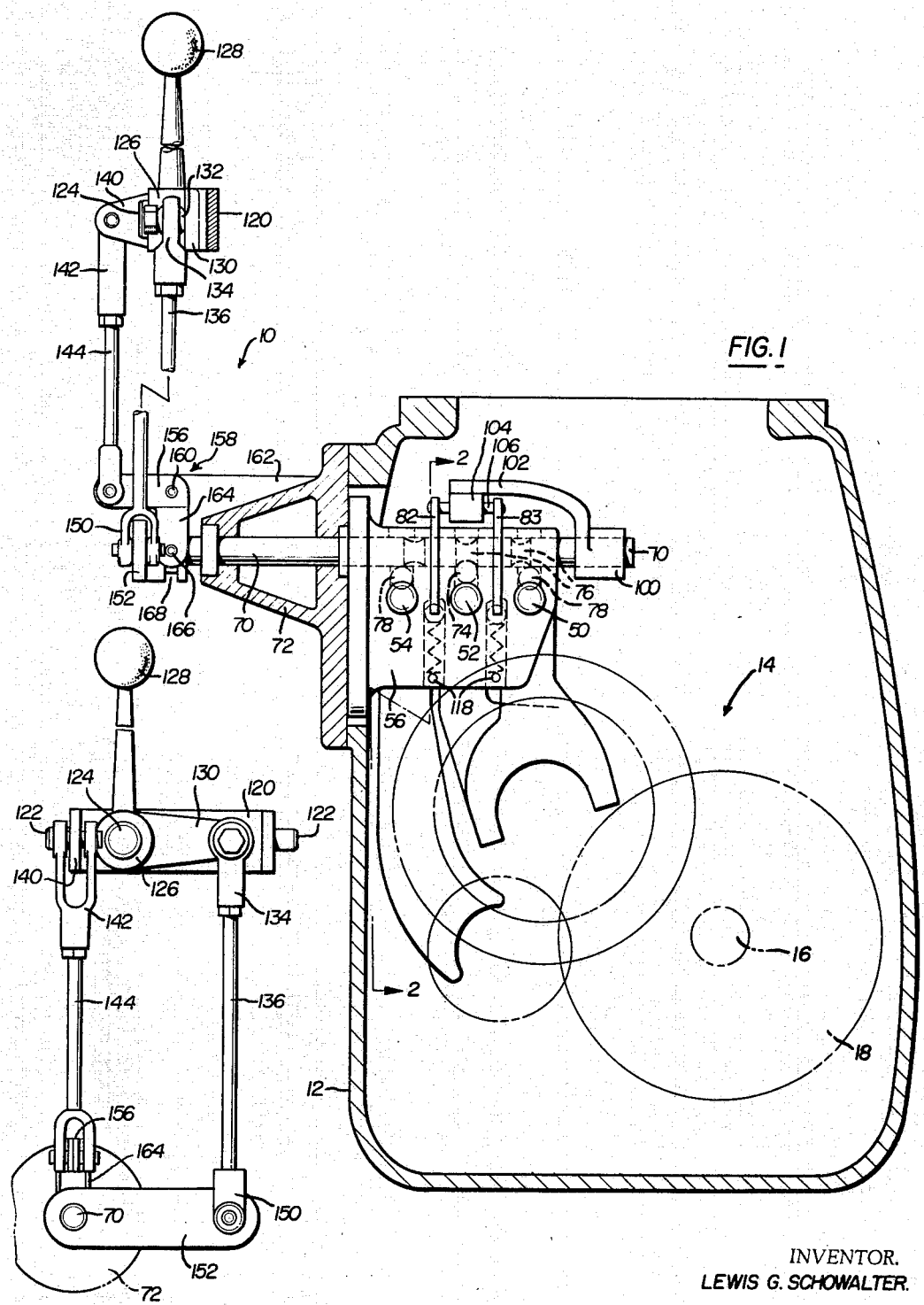

March 17, 1970  L. G. SCHOWALTER  3,500,697
SHIFTING DEVICE FOR TRANSMISSION
Filed Aug. 29, 1968  4 Sheets-Sheet 3

INVENTOR.
LEWIS G. SCHOWALTER.
BY
SETTLE, BATCHELDER & OLTMAN.
ATT'YS.

United States Patent Office 3,500,697
Patented Mar. 17, 1970

3,500,697
SHIFTING DEVICE FOR TRANSMISSION
Lewis G. Schowalter, Racine, Wis., assignor to J. I. Case
Company, Racine, Wis., a corporation of Wisconsin
Filed Aug. 29, 1968, Ser. No. 756,153
Int. Cl. G05g 5/10, 9/00
U.S. Cl. 74—477                    16 Claims

ABSTRACT OF THE DISCLOSURE

A gear shift mechanism including a rotatable and axially movable shaft extending transversely of a plurality of rails supporting shifter forks and in which axial movement of the shaft determines the fork to be shifted while rotational movement causes the axial shifting of the fork. Lock means are interposed between the shaft and the respective forks which lock all but one of the forks in the neutral position at any given time. A specific interconnection is provided between adjacent pairs of forks which cooperate with rotational movement of the shaft to cause the shifting of the associated fork from the neutral to either of the engaged positions.

BACKGROUND OF THE INVENTION

The present invention relates generally to change-speed transmissions and more particularly to an improved shifting mechanism for a sliding gear transmission.

Transmissions normally employed in heavy duty vehicles, such as agricultural and light industrial tractors, often require that the transmission be capable of being operated at the plurality of fixed ground speeds. Present day transmissions for such vehicles are being designed for greater versatility so as to be capable of being used in all types of agricultural and other operations. This of course necessitates a large number of gear ratios in a transmission which is capable of general universal application. Thus, many present day vehicles have transmissions which include 12 or more gear ratios for allowing for a greater selection of ground speeds.

Of course, some type of manual control member must be connected to the transmission so as to be capable of shifting the various gears from the operator's station to attain the desired ratio.

The large number of gear ratios in present day transmissions has necessitated in many instances to provide two or more separate control levers for the shifting of the respective gears. Of course, such a practice is highly undesirable since it increases the already congested area of the operator's compartment of the vehicle and of course requires greater mental dexterity in determining which of the numerous number of handles or levers is appropriate for the selection of the particular speed change being desired.

While several types of single lever control mechanisms have been proposed, such as a single lever control of Heald in Patent No. 3,312,119, these shifting mechanisms have not attained the degree of success due to various shortcomings.

SUMMARY OF THE INVENTION

The shifting mechanism of the present invention incorporates a single shift lever control for shifting a plurality of speed-change gears of a transmission and which incorporates a positive locking feature for locking all but one of the plurality of gear shifting forks in the neutral position and also incorporates a unique automatic locking device for locking the fork and the associated gear in the engaged position.

Thus, the primary object of the present invention is to provide an improved single lever control shifting mechanism which is capable of shifting a plurality of gears.

Another object is to provide an improved shifting mechanism which incorporates positive locking means for maintaining all but one of a plurality of shifter forks in the neutral position while the selector shifter fork is being moved between neutral and engaged positions.

A further object is to provide an improved shifting mechanism which incorporates a simple and efficient interconnection between a single lever control and a plurality of shifter forks associated with a plurality of shiftable gears.

A still further object is to provide an improved shifting mechanism for a sliding gear transmission which incorporates positive engaged position holding means maintaining the selected gear in the engaged position without relying upon the conventional resilient biasing means.

Other objects of this invention will appear in the following description and appended claims reference being had to the accompanying drawings forming a part of this specification wherein like reference characters designate corresponding parts in the several views.

BRIEF DESCRIPTION OF DRAWINGS

FIGURE 1 shows a vertical sectional view of a transmission housing embodying the shifting mechanism of the present invention;

FIGURE 2 is an end view of the shifting lever and associated mechanism;

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways.

Figure 3:
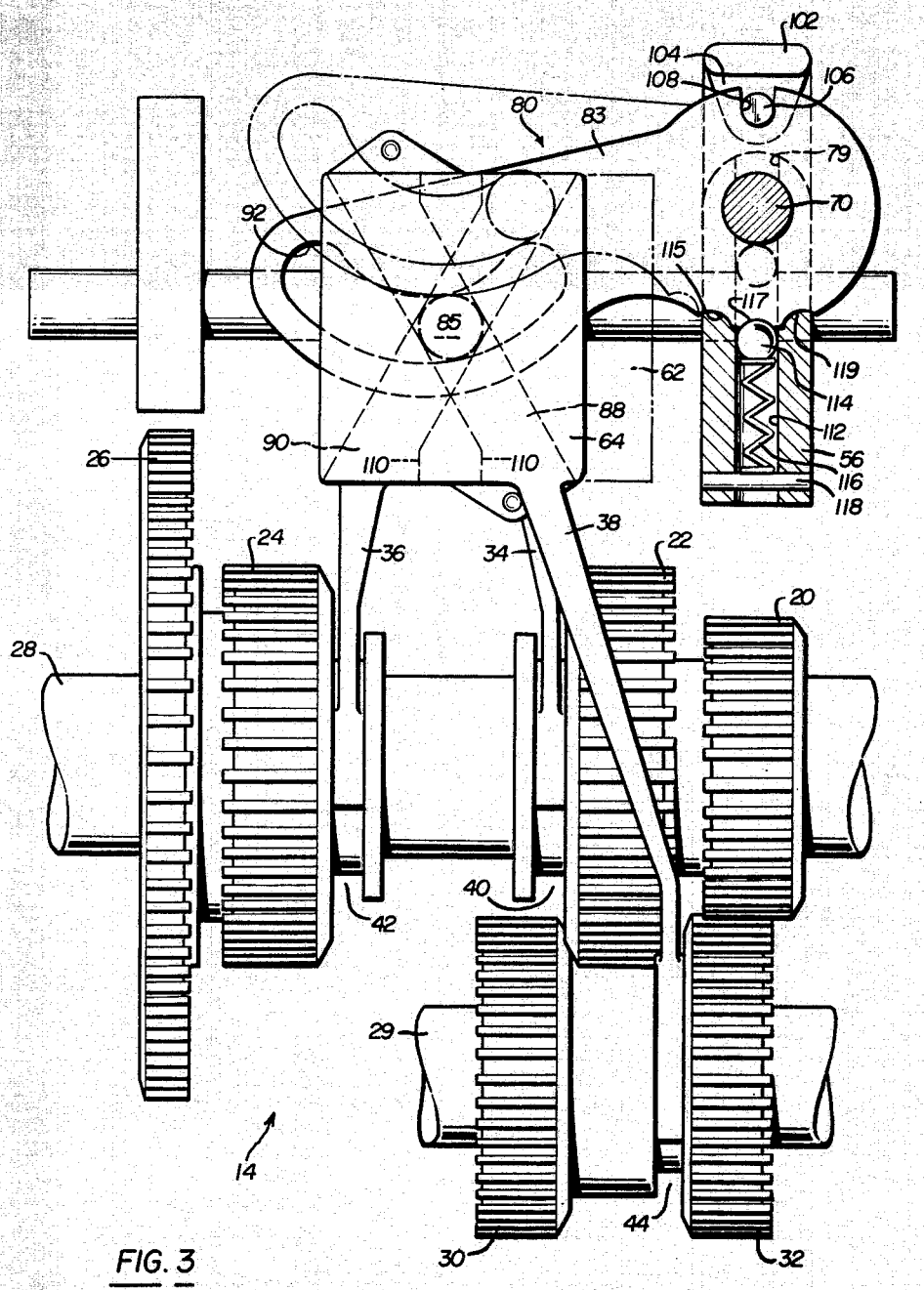
FIGURE 3 is a vertical sectional view taken generally along lines 2—2 of FIGURE 1.

FIGURES 1 and 3 of the drawings show the shifting mechanism 10 of the present invention supported by a housing 12 which encloses the gears 14 of a conventional transmission, the majority which is only shown in phantom lines. The output shaft 16 is generally driven at a plurality of speed ratios with respect to the input shaft (not shown) by selectively engaging a plurality of gears 18 carried by the output shaft 16 with gears 20 through 26 carried by a countershaft 28 generally driven at a fixed speed by the input shaft (not shown).

A second idler shaft 29 supports a pair of gears 30 and 32 which perform the function of reversing the direction of rotation of the output shaft with respect to the input and countershafts.

Each pair of gears 20 through 26 and 30, 32, respectively, are adapted to be moved by respective shifter fork arms 34, 36 and 38 each slidable engaging collars 40, 42 and 44 forming part of the respective pairs of gears. Of course, the respective gears and associated collars are all splined or otherwise connected for axial sliding but non-rotational movement on the countershaft.

The respective fork arms 34, 36 and 38 each are fixedly secured at their upper end to respective rails 50, 52 and 54 by blocks 60, 62 and 64. The rails 50, 52 and 54 are supported for axial sliding movement along generally spaced parallel paths by having opposite ends slidable in openings formed in the legs of a U-shaped bracket 56 fixedly secured to the transmission housing 12.

The interconnection between the respective rails 50 through 54 and the associated fork arms 34 through 38 through blocks 60, 62 and 64, which will be discussed in more detail hereinafter.

The shifting of the respective fork arms is accomplished through a single control shaft 70 which is mounted for axial and rotational movement with respect to the housing 12 by a hub portion 72 fixedly secured to the outer surface of the transmission housing 12.

According to one aspect of the present invention, selector locking means are interposed between the respective rails 50, 52 and 54 and the transversely extending axially movable and rotatable shaft 70 so as to lock all but one of the sliding rails and associated shifter elements in the neutral position. The locking means for restraining all but one of the rails includes three sets of cooperating recesses 74 and 76 with the recesses 74 defined on the respective rails 50, 52, and 54 while the second recesses 76 are respectively defined on the actuating shaft 70. A ball 78 cooperates with each of the set of recesses and is slidable vertically in an opening 79 formed in the leg of the bracket 56 to define the locking means for each of the rails.

It will be noted that the axial spacing between adjacent recesses 76 on the shaft 70 is slightly less than the transverse spacing between adjacent parallel rails, 50, 52 and 54, so that only a single set of cooperating recesses 74 and 76 are aligned with each other during axial movement of the shaft 70. It will also be noted from an inspection from FIGURE 1 that the central rail 52 has the cooperating recess 76 aligned with the axis of the rail 52 and therefore the recess 74 so that this rail is capable of being shifted along the path defined on the bracket 56. This is accomplished by the ball 78 being capable of moving vertically in opening 79 and recess 78 a sufficient distance to allow the rail 52 to be moved axially.

Of course, the balls or spherical elements 78 associated with the other two rails are locked in the lower recess defined on the respective rails by the outer peripheral surface surface of the shaft 70. This prevents the ball 78 from being moved out of the lower recess 74. The ball 78 associated with the middle rail 52 is capable of being moved out of the lower recess 74 so as to allow relative movement of the rail 52 with respect to the shaft 70, in a manner which will become apparent hereinafter.

Of course, it can be appreciated that axial movement of the shaft leftward as viewed in FIGURE 1 will align the respective cooperating recesses 74 and 76 associated with the rail 54 while axial movement rightward as viewed in FIGURE 1 will cause the recesses 74 and 76 associated with rail 50 to be vertically aligned.

Figure 4:
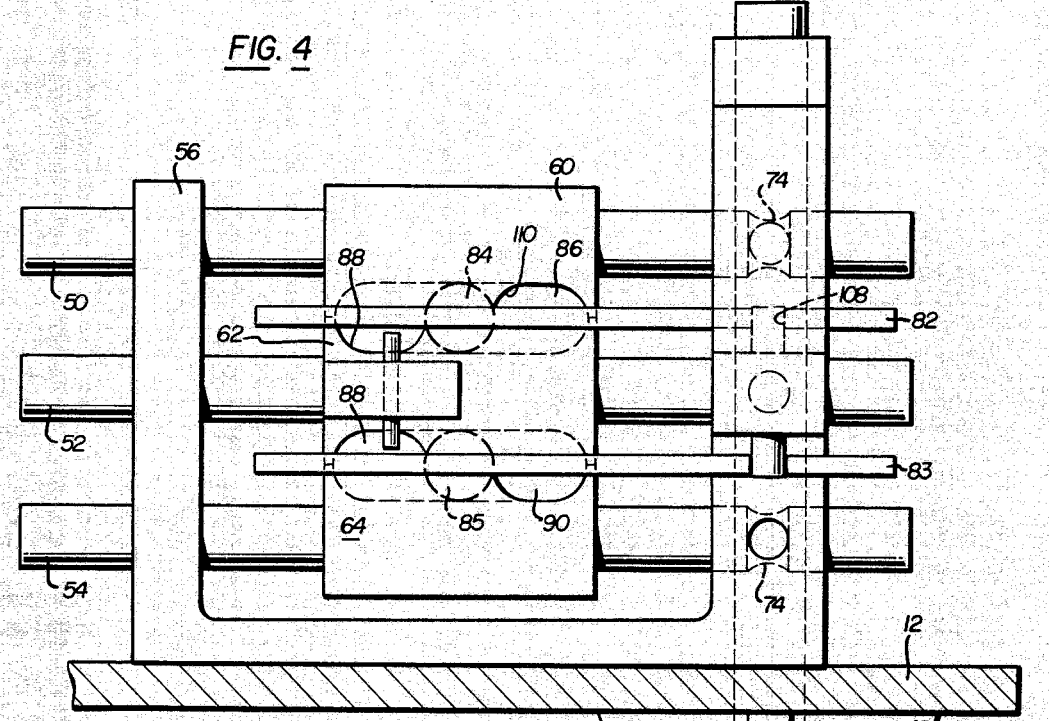
FIGURE 4 is an enlarged plan view of the shifting mechanism of the invention.
Figure 5:
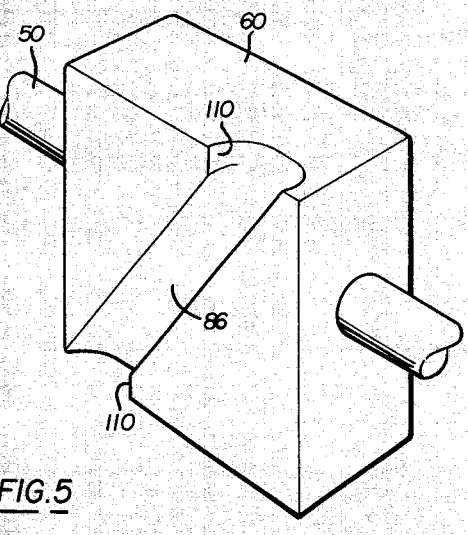
FIGURE 5 is an enlarged perspective view of one of the elements of the shifting mechanism of the present invention.

According to a further aspect of the present invention, improved means are incorporated in the shifting mechanism for producing the sliding movement of the shifter elements which include the rail and associated block and arm, such as rail 50, block 60 and supporting fork arm 34. With particular reference to FIGURES 3, 4, and 5, the shifter element shifting means 80 includes a pair of arms 82, 83 respectively rotatable on and/or with the shaft 70.

The shifting means 80 further includes movable elements or balls 84, 85 interposed between adjacent shifter forks or elements partially defined by the blocks 60, 62, 64 and guided for movement with respect to each of the blocks 60 through 64. One such movable element 84 is interposed between each adjacent pair of blocks or shifter forks and is guided for movement along adjacent intersecting non-parallel paths defined on surfaces of the respective blocks. As more clearly shown in FIGURE 5, the means defining the intersected paths includes a groove 86 formed on one surface of a block, such as block 60, with the groove being angularly disposed with respect to the path or axis of movement of the associated shifter element including rail 50, block 60 and fork 34. The second block 62, which is located adjacent the block 60, has a similar groove 88 which is also angularly disposed with respect to the path of travel of the block 62 but extends in the opposite direction of the angularly inclined groove 86.

In the illustrated embodiment the block 62 has a second groove 88 identical to groove 88 on the opposite surface of the block and inclined in the same direction, for a purpose which will become apparent hereinafter. The third block 64 again has an angularly inclined groove 90 extending generally in the same direction as the groove 86 in the block 60. Of course, a second movable member 85 is guided in the intersecting grooves 88 and 90 formed on the adjacent surfaces of the respective blocks 62 and 64.

The angular relation of the grooves is more clearly shown in FIGURE 3 wherein the respective blocks are shown in the neutral position wherein the grooves 88 and 90 intersect adjacent the midpoint thereof and support the movable element 85 intermediate the opposite ends of each of the grooves.

An inspection of FIGURE 4 clearly shows that the diameter of the movable element 84 is substantially equal to the combined depths of the two grooves 86 and 88 while the element 85 has a diameter equal to the combined depths of grooves 88 and 90 so that the portion of the two associated grooves receiving the movable elements or balls must be in transverse alignment with each other. Also, each arm 82, 83 cooperates with one of the movable elements 84, 85 and has an arcuate opening 92 which supports and receives the movable element to allow for relative movement between the balls 84, 85 and the arms 82, 83.

The shifting of the arms 82, 83 is occasioned by rotational movement of the shaft 70 in a manner which will now be described. The shaft 70 has a boss 100 (FIGURE 1) fixedly secured to the free end thereof which supports an arm 102 overlying the central portion of the shaft adjacent the rails. The arm 102 supports a bracket 104 having a pin 106 extending from opposite surfaces thereof. The pin 106 (FIGURES 3 and 4) is received in recesses 108 formed on the respective arms 82, 83.

In the position illustrated in the drawings, the pin 106 is in engagement with both of the recesses 108 formed in the respective arms 82, 83 thus causing a shifting or rotational movement of both arms in response to rotation of the shaft 70. Of course, it will be appreciated that axial movement of the shaft 70 rightward as viewed in FIGURE 1 will cause the lefthand end of the pin 106 to move out of the associated recess 108 formed in the arm 82. Thus, when the shaft 70 is moved rightward to cause the recess 74 on rail 50 to be aligned with recess 76, the lefthand end of pin 106 will be freed from the arm 82. This is necessary to allow only movement of the right arm 82 when the rails 52 and 54 are locked since the ball 85 associated with the recesses 88 and 90 is not capable of being moved with the elements in the above described locked position.

Thus, it can be seen that with the shaft 70 in the axial position shown in FIGURE 1, only the central rail 52, its associated block 62 and shifter fork arm 36 may be moved since the remaining two rails 50 and 54 are locked in the neutral position by the respective balls 78 locked in the recesses 74 by the shaft 70. Thus, clockwise rotation of the arms 82, 83 will cause the free ends thereof to move upwardly and guide the balls or movable elements 84, 85 along the arcuate openings 92. Since the block 64, as well as block 60 located on the opposite sides of the block 62, are both fixed or restrained from movement, the position of the grooves 86 and 90 remains fixed. This means that the balls 84, 85 must move along the grooves 88 defined on the center block 62.

The clockwise rotation of the arm 82 and arm 83 will therefore move the balls 84, 85 to the extreme right end of the arcuate openings 92 and cause a shifting of the balls in both of the grooves 86 and 88 as well as grooves 88 and 90 to move the center block 62 to the dotted line position shown in FIGURE 3. This moves the associated gears 20 and 22 to the right causing engagement of gear 20 with its associated gear on shaft 16. Of course, counterclockwise rotation of the arms 82, 83 from the solid line position shown in FIGURE 3 will cause a shifting of the balls 84, 85 downwardly in the respective grooves to appropriately move the center block or shifter element 62 leftward as viewed in FIGURE 3 from the solid line position shown to cause a shifting of the gears 20 and 22 in the opposite direction to cause engagement of gear 22.

According to a further aspect of the present invention, a unique locking arrangement is provided for maintaining the respective gears in the engaged position. This simple and efficient locking mechanism for the engaged gear assures a positive lock at all times without reliance upon the conventional springs which were heretofore a necessary element of any locking means for the respective gears. As shown in FIGURES 3, 4 and 5, it will be noted that the upper and lower ends of each of the grooves have a flattened portion 110 which extends perpendicular to the path of travel of the associated block. Thus, when the ball 84 associated with the particular groove, such as groove 86, is moved to the extreme upper or lower position on the particular block, the ball will be received in the portion defined by the flat portion 110 of the associated groove. Any forces tending to cause disengagement of the associated engage gear will of course be axial to the countershaft 28 and thereby axial to the rail 52. This force will of course be absorbed by having the ball 84 engage the perpendicular or vertical surface 110 of the groove thereby preventing any possibility of allowing the gear to partially disengage when it is supposed to be in the fully engaged position.

According to an additional aspect of the present invention, further means are provided for maintaining the balls or movable element 84, 85 in the completely engaged position to insure that the gear may not be inadvertently in the partially engaged position thereby enhancing the possibility of damage to the gears as well as the associated mechanism. This is accomplished by providing openings 112 (FIGURE 3) in the leg of bracket 56 which are respectively in alignment with the arms 82, 83. The openings 112 each slidably receive a ball 114 which is biased to the position shown in FIGURE 3 by a spring 116 having one end in engagement with a pin 118 extending transversely across the lower end of the openings 112. Each arm 82, 83 is provided with three spaced recesses 115, 117 and 119 which respectively define engaged, neutral and engaged positions of the arms and associated blocks which are moved to the engaged positions by the respective arms. Of course, the spring biased ball or member 114 not only further assists in a positive retention of the associated shifted gear in the fully engaged position, but also gives the operator a feel of when the associated gear is in the completely or fully engaged position.

According to a still further aspect of the present invention, the shaft 70 is adapted for two degrees of freedom of movement, namely axial movement and rotational movement, which is accomplished by a single manual control member likewise operable in two degrees in freedom of movement. For this purpose, a generally U-shaped bracket 120 (FIGURES 1 and 2) has a pair of stub shafts 122 respectively supported on the legs thereof which are pivotally connected in a conventional manner to the vehicle (not shown). A stub shaft 124 likewise is fixedly secured to the base portion of the bracket 120 and extends outwardly between the two end legs thereof. The hub portion 126 of a control lever 128 is pivotally supported on the stub shaft 124 and has an arm 130 fixedly secured thereto, the free end of which supports a ball 132 forming a spherical support surface for a socket member 134 connected to one end of a link 136, for a purpose which will become apparent hereinafter.

The one leg of the U-shaped bracket 120 has an extension 140 extending outwardly therefrom to which is connected a clevis 142 supported on one end of a link 144. Thus, movement of the manual control lever in the plane shown in FIGURE 1, will cause a pivotal rotation of the entire bracket about the stub shafts 122 to cause a raising and/or lowering of the link 144, for a purpose which will become apparent hereinafter. Likewise, movement of the control lever in the plane shown in FIGURE 2 will cause a rotational movement of arm 130 about stub shaft 124 to raise and lower link 136.

The lower ends of links 136 and 144 are respectively connected to the shaft 70. For this purpose, the lower end of the link 136 has a clevis 150 fixedly secured thereto which is connected to an arm 152 carried by the end of the shaft 70. Thus, a raising and lowering of the link 136 in the manner described hereinabove will cause a rotation of the shaft 70 in the hub portion 72.

The lower end of the link 144 is connected to one arm 156 of a bellcrank 158 pivotally supported intermediate its ends at 160 on a flange 162 fixedly secured to the hub 72. The opposite arm 164 of the bellcrank 158 is in the form of a clevis having legs extending on opposite sides of the shaft 70 and respectively supporting pins 166 received in a collar 168 fixedly secured to the shaft 70.

Thus, movement of the control lever 128 in the plane shown in FIGURE 1, will raise and lower the link 144 thereby pivoting bellcrank 158 about pivot point 160 to cause an axial shifting of the shaft 70 with respect to the hub 72 while rotation of the lever in the plane shown in FIGURE 2 will cause rotation of the shaft 70. The axial and rotational movement of the shaft 70 will of course perform the function of selecting the desired shifter element to be moved and causing a movement of the selected shifter element, respectively.

OPERATION

The operation of the device can readily be appreciated from the above description. The first step in the operation of the shifting mechanism of the present invention is to move the manual control lever 128 leftwardly or rightwardly as viewed in FIGURE 1 to select the desired shifter element to be actuated. Once the desired shifting element has been selected, the control lever 128 is moved in a plane perpendicular to that just described to cause a rotational movement of the shaft 70 through the arms 130 and 152 as well as the link 136. This, of course, causes a corresponding rotational movement of the arm 102 fixedly secured to the end of shaft 70 to thereby cause a rotational movement of one or both of the arms 82, 83 rotatably supported on the shaft 70.

Rotation of the arms 82, 83 will cause a raising or lowering of one or both of the movable elements 84, 85 thereby shifting the elements along the cooperating grooves 86, 88, 90 to move the appropriate shifter element causing an engagement of the appropriate gear associated therewith. Of course, when the arm 82 or 83 has reached the extreme position, the operator will feel the movement of the retention means 114 in the appropriate recess 120 or 124 to give an indication that the selected gear is in the completely engaged position.

In this completely engaged position, the particular ball is interposed between opposing flattened portions 110 of the cooperating grooves to securely lock the selected gear in the engaged position.

Of course, any selected desired gear ratio may be obtained by appropriate manipulation of the manual control lever through the two mutually perpendicular paths of movement.

FIGURES 6 AND 7 EMBODIMENT

Figure 6:
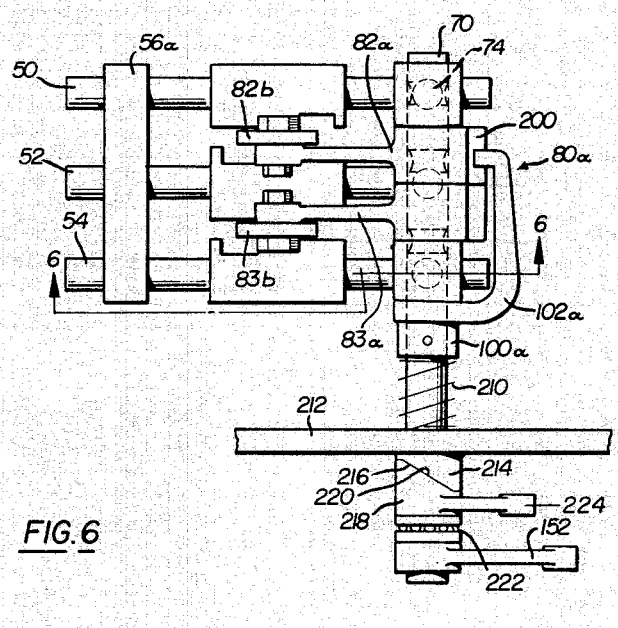
FIGURE 6 is a plan view of a slightly modified form of the shifting mechanism of the present invention.
Figure 7:
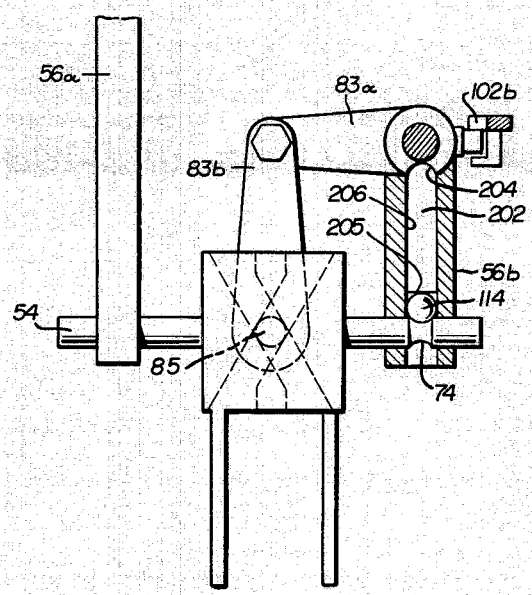
FIGURE 7 is a vertical section along line 6—6 of FIGURE 6.

The modified embodiment disclosed in FIGURES 6 and 7 is in most respects identical to that disclosed in the embodiment hereinabove described and thus the same reference numerals have been applied to the identical parts. The modified embodiment varies in the actuating mechanism 80a for shifting the respective shifter elements and includes members 82a, 83a rotatably supported on the axially and rotatable shaft 70 with the free ends of the arms having links 82b and 83b pivotally connected thereto. The free ends of the links 82b and 83b each have openings which respectively surround the movable elements or balls 84 and 85.

The means for pivoting or rotating the arms 82a with the shaft includes an arm 102a connected to hub 100a and having a bifurcated end 102b which is slidably received on flanges 200 extending from hub portion of the members 82a and 83a.

In the modified embodiment the springs 116 are replaced by rods 202 having one spherical end 204 with the opposite flat ends 205 engaging the balls or movable elements 114 adapted to be received in the recess 74 formed on each of the rods or rails 50, 52 and 54. Of course, the upper or spherical end 204 of the rod 202, which is slidable in an elongated opening 206, is adapted to be received in the cooperating recesses 74 formed on the axially movable and rotatable shaft 70. As was explained in the embodiment described hereinabove, the two recesses 74 and 76 must both be in axial alignment with the opening 206 to allow the associated rail to be shifted from the neutral to either of the engaged positions.

The modified embodiment also incorporates modified means for shifting the shaft or single member 70 axially along its path of movement. In the embodiment illustrated in FIGURES 6 and 7, a spring 210 is interposed between a boss 100a fixedly secured to the shaft and a support member 212 which forms part of the housing for the transmission. The support member 212 has a camming member 214 fixedly secured thereto which has an inclined camming surface 216 extending angularly with respect to the axis of the shaft 70. A second camming member 218 has a cooperating camming surface 220 and is fixedly secured to the shaft 70 intermediate the arm 152 with a bearing 222 interposed between the arm 152 and the cam member 218. An arm 224 is fixedly secured to the camming member 218.

Of course, rotational movement of the camming member 218 with respect to the shaft 70 will cause relative movement between the inclined surfaces 216 and 220 and shift the shaft 70 axially downwardly as viewed in FIGURE 6.

The operation of the modified form of the invention is identical to that disclosed and described hereinabove, and it is believed that detailed description thereof does not appear to be necessary. However, it should be noted that since there are no detent means provided for defining the respective engaged position of the two arms 82a, it is necessary in the modified form of the invention to provide positive stops for defining the extreme positions of the manual control lever (not shown in the drawings).

I claim:

1. A gear shift mechanism for a sliding gear transmission and including a pair of shifter elements guided for movement along spaced parallel paths in a housing and movable in opposite directions from neutral positions for selectively engaging gears of said transmission and a shaft mounted for axial and rotational movement in said housing for selectively shifting said shifter elements, the improvement comprising selector locking means interposed between each said shifter elements and said shaft for selectively locking said shifter elements in the neutral position, a shifting member between said shifter elements, means defining intersecting paths for said shifting member on adjacent surfaces of said shifter elements and supporting said member, means interposed between said shaft and said shifting member for moving said shifter member in response to rotation of said shaft and means for axially moving said shaft for releasing one of said shifter elements while locking the other of said shifter elements in the neutral position and for rotating said shaft whereby axial movement of said shaft selects the shifter element to be moved and rotational movement causes shifting of the selected shifter element.

2. A gear shift mechanism as defined in claim 1, in which said means defining intersecting paths includes grooves in said surfaces and disposed angularly of the path of movement of said shifter elements, each said grooves having end portions extending substantially perpendicular to the paths of movement of said shifter elements and defining engaged locking means for maintaining the associated shifter element in the engaged positions.

3. A gear shift mechanism as defined in claim 1, wherein said shaft extends transversely of said paths of said shifter elements and in which said selector locking means each include a spherical member and cooperating recesses respectively defined on said shaft and the shifter element with said recesses on said shaft axially spaced a distance less than the distance between said recesses on the respective shifter elements whereby only one set of cooperating recesses may be aligned at any position of said shift and whereby said spherical element associated with the other set of recesses locks the associated shifter element in the neutral position.

4. A gear shift mechanism as defined in claim 1, in which said last means includes a control lever mounted for pivotal movement in two substantially perpendicular intersecting planes, a first connection means between said lever and said shaft for axially shifting said shaft in response to movement of said lever in one of said planes, and a second connection means between said lever and said shaft whereby movement of said lever in the other of said planes causes rotation of said shaft.

5. A gear shift mechanism as defined in claim 4, in which said first connection means includes a bellcrank pivotally supported on said housing and having a first arm operatively connected to said lever and a second arm operatively connected to said shaft whereby movement of said lever in said one of said planes will pivot said bellcrank to shift said shaft.

6. A gear shift mechanism as defined in claim 4, in which said first connection means includes first means defining a first camming surface on said housing, second means defining a second camming surface on said shaft and cooperating with said first camming surface and operatively connected to said lever whereby movement of said lever causes relative movement of said camming surfaces to axially move said shaft.

7. A gear shift mechanism as defined in claim 1, in which said means interposed between said shaft and said shifting member comprises an arm operatively connectible to said shaft for rotation therewith and means defining an arcuate recess on said arm and receiving said shifting member, said shifting member comprising a ball guided along said intersecting paths.

8. A gear shift mechanism as defined in claim 1, in which said means interposed between said shaft and said shifting member comprises an arm selectively rotatable with said shaft and means operatively connecting said arm to said shifting member whereby rotation of said shaft will move said shifting element along said intersecting paths.

9. In combination with a gear transmission having at least two shifter elements respectively associated with gears of said transmission and movable along paths in opposite directions from a neutral position by a single member mounted for two degrees of freedom of movement, a shifter member interposed between each pair of shifter elements, first means interposed between said single member and each shifter element for selectively restraining all but one shifter element from movement from the neutral position, second means carried by said single member for moving said shifter member in response to movement of said single member along one degree of movement and third means on each shifter element defining a path of movement for the associated shifter member whereby movement of the single member in the first degree of movement determines the shifter element to be actuated and movement of the single member in the second degree of movement causes movement of the selected shifter element to engage the associated gear.

10. The combination as defined in claim 9, wherein said shifter elements are movable along spaced parallel paths and said single member is disposed transversely of said paths and spaced above said paths, said first means comprising means defining cooperating pairs of recesses respectively on said single member and said shifter elements with said recesses on said single member spaced a distance less than the spacing between said paths and a ball cooperating with each pair of recesses for locking the associated shifter element in neutral position when the recess on the single member is not in alignment with the associate recess on the associated shifter element.

11. The combination as defined in claim 9, in which said second means comprises an arm supported on said single member and fixed for rotation therewith for movement with said single member in said one degree of movement and means operatively connecting said arm to said shifter member.

12. The combination as defined in claim 9, in which said third means on each shifter element defining a path comprises intersecting grooves angularly related to said paths and respectively disposed on adjacent surfaces of said shifter elements, each said grooves having a portion at opposite ends thereof disposed perpendicular to said paths and defining engaged locking positions for said shifter elements.

13. The combination as defined in claim 9, including the further improvement of fourth means for moving said single member along said two degrees of movement comprising first and second elements respectively carried by said single member and a fixed support adjacent said single member, said elements having inclined cooperating camming surfaces whereby relative movement of said elements causes movement of said single member along said first degree of movement and a third element fixed to said shaft for causing movement of said single member along said second degree of movement.

14. The combination as defined in claim 9, including the further improvement of fourth means for moving said single member comprising a first element pivotally secured to a fixed support adjacent said single member and operatively secured thereto and a second element fixedly secured to said single member whereby movement of said first and second elements, respectively causes movement of said single member along said first and second degrees of movement.

15. A shifting mechanism for a sliding gear transmission comprising a plurality shifting rails movable in opposite directions from neutral positions all spaced parallel paths, a shaft extending transversely of said paths and mounted for axial and rotational movement, the improvement of means defining cooperating pairs of recesses on each of said rails and shaft with the recesses on said shaft spaced a distance less that the spacing between said paths, locking means cooperating with each pair of recesses for locking all but one rail in neutral position, shifting members respectively disposed between adjacent rails with means defining intersecting paths on adjacent rails for each shifting member, arms supported on said shaft and respectively cooperating with said shifting members and means interposed between said shaft and said arms for selectively connecting at least one arm to said shaft for rotation therewith whereby axial shifting of said shaft selectively recesses only one of said rails while rotation of said shaft causes movement of said one rail from the neutral position.

16. A shifting mechanism as defined in claim 15, said means defining intersecting paths includes means defining grooves on said rails with opposed ends of each groove having a surface extending perpendicular to said path to define engaged locking means for said shifting members.

References Cited

UNITED STATES PATENTS 1,984,354   12/1934   Campbell _____ 74—337.5 X
2,929,260   3/1960    Hodkin _____ 74—473

MILTON KAUFMAN, Primary Examiner

U.S. Cl. X.R.

74—337.5, 475